United States Patent [19]

Paulsen

[11] Patent Number: 5,277,671
[45] Date of Patent: Jan. 11, 1994

[54] HYDRAULIC CONTROL OF EPICYCLIC-TYPE CHANGE-SPEED GEARBOX

[75] Inventor: Lutz Paulsen, Esslingen, Fed. Rep. of Germany

[73] Assignee: Mercedes-Benz AG, Fed. Rep. of Germany

[21] Appl. No.: 948,637

[22] Filed: Sep. 23, 1992

[30] Foreign Application Priority Data

Oct. 3, 1991 [DE] Fed. Rep. of Germany ....... 4132873

[51] Int. Cl.⁵ .............................................. F16H 61/18
[52] U.S. Cl. .................................................. 475/116
[58] Field of Search ........................ 475/116, 122, 123

[56] References Cited

U.S. PATENT DOCUMENTS

5,199,313  4/1993  Müller .................... 74/335

FOREIGN PATENT DOCUMENTS

| 23213 | 6/1982 | Austria . |
| 0053506 | 6/1982 | European Pat. Off. . |
| 56-73249 | 6/1981 | Japan .................... 475/116 |
| WO88/01029 | 2/1988 | PCT Int'l Appl. . |
| 925690 | 5/1982 | U.S.S.R. .................... 475/116 |

OTHER PUBLICATIONS

Neue Vollautomatische Nutzfahrzeuggetriebe von Daimler-Benz; Wolfgang Möller, Karl-Friedrich Kraft and Lutz Paulsen; pp. 677–682, 1986 ATZ.

*Primary Examiner*—Rodney H. Bonck
*Assistant Examiner*—Khoi Ta
*Attorney, Agent, or Firm*—Evenson, McKeown, Edwards & Lenahan

[57] ABSTRACT

An automatic selector device for actuating a frictional selector device, i.e. a clutch or brake, combines a selector actuator, a selector valve for the working pressure of the selector actuator, a change control valve dependent on the steady-state condition of the selector device and a switch-over control valve which can be triggered by an electronic control unit. In the case of failure of the control unit or the voltage supply, the selector device remains actuated in its instantaneous steady-state condition.

7 Claims, 1 Drawing Sheet

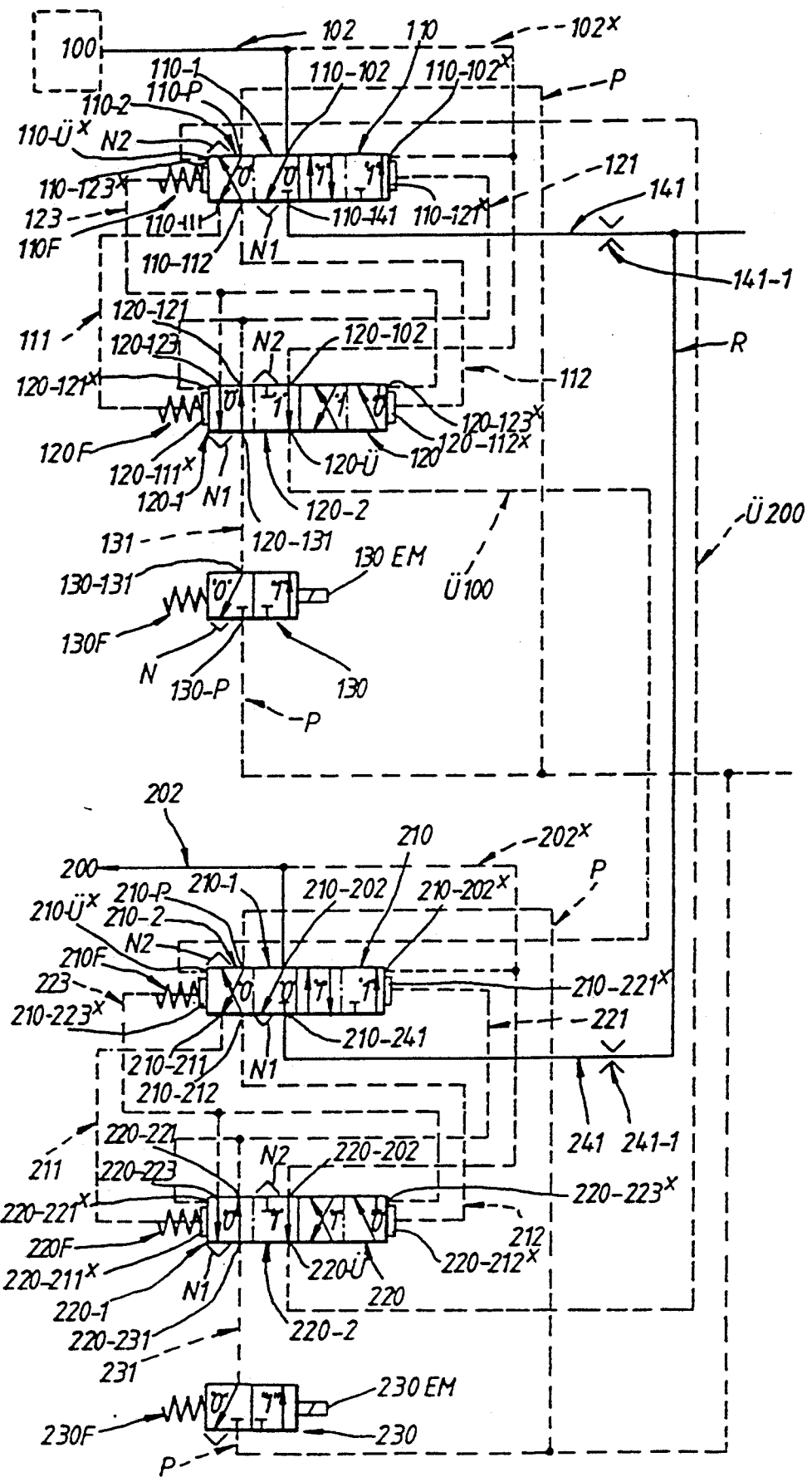

HYDRAULIC CONTROL OF EPICYCLIC-TYPE CHANGE-SPEED GEARBOX

CROSS-REFERENCE TO RELATED APPLICATIONS

This application is related to application Ser. No. 07/908,255 filed on Jul. 6, 1992 in the name of Lutz Paulsen, et al. for AUTOMATIC SELECTOR OF A MOTOR VEHICLE EPICYCLIC CHANGE-SPEED GEARBOX; application Ser. No. 07/914,536 filed on Jul. 17, 1992 in the name of Lutz Paulsen for AUTOMATIC SELECTOR DEVICE FOR A MOTOR VEHICLE CHANGE-SPEED GEARBOX; and application Ser. No. 07/917,171, now U.S. Pat. No. 5,199,313 filed on Jul. 23, 1992 in the name of Alfons Müller for AUTOMATIC SELECTOR DEVICE OF A CHANGE-SPEED GEARBOX OF A MOTOR VEHICLE.

BACKGROUND AND SUMMARY OF THE INVENTION

The present invention concerns an automatic selector device, and more particularly, an automatic selector device for a change-speed gearbox of the epicyclic type, having frictional selector apparatus configured to be engaged by a selector actuator of axial piston type between plural gearbox elements rotatable relative to one another, comprising a selector valve for application of working pressure to the selector actuator and an electromagnet switch-over control valve configured to be electronically triggered to switch over the selector valve, both the selector valve and the switch-over control valve are arranged to be respectively switched over between a rest position selectable by spring force and a working position. The selector actuator is connected to a pressure-relieved zero connection in the rest position of the selector valve and is connected to a system pressure conduit carrying a controlled system pressure in the working position, while a control connection of the selector valve used for switching over into the rest position is connected to a pressure-relieved zero connection in the rest position of the switch-over control valve and connected to a control pressure supply conduit carrying a control pressure in the working position of the switch-over control valve.

A selector device is described in ATZ Automobiltechnische Zeitschrift 88 (1986) 12, p. 681. The known selector device consists of an electronic part and a hydraulic part. Whereas the hydraulics are responsible, among other things, for applying pressure to the currently actuated selector actuators, the electronics control the gear change and also, to some extent, regulate the level of the hydraulic pressure. The connection between the electronics and the hydraulics is usually achieved by electromagnetic 3/2-way switch-over control valves. These are designed in such a way that when they are excited, i.e. when an electric current flows through their coil, the associated selector actuator is subjected to hydraulic pressure.

In the known selector device, interruption of the electric current to the switch-over control valves, whether due to a defect in the electronic control or due to the failure of the voltage supply, leads to interruption of the force path. This can produce dangerous driving situations because either, in overrun, the engine brake (and possibly a retarder located in front of the gearbox) becomes ineffective or, when the engine is in traction, the engine torque is no longer available on a gradient.

In order to avoid the problem described, it has been considered to use so-called locking solenoid valves equipped with a permanent magnet which ensures that, in the absence of an electrical supply, the solenoid valve remains in one position once it has been reached. Switching over into the respective other position takes place by way of a short selection pulse whose sign defines the switching position.

In addition to the more complicated design of the electromagnetic valve and the necessary triggering by a reversible current direction, the foregoing proposal has the disadvantage that the switching position of the valve is not unambiguous when there is no current flowing through the coil. It could happen, for example, that a valve previously in the activated position could move unintentionally into the deactivated position due to vibrations, external magnetic fields and the like, so that the relevant selector actuator again becomes unpressurized.

Even more serious is the problem of defined deactivation. Should the electrical connection to a solenoid valve have been interrupted, the solenoid valve and, therefore, the associated selector actuator can no longer be deactivated so that, for example, it is more difficult to tow the vehicle, or the gearbox could even be jammed if a different selector actuator were activated.

An object on which the present invention is based consists essentially in ensuring that the selector actuator which has just been actuated remains subjected to working pressure even in the case of a failure of the electrical voltage supply. When the engine is switched off, the selector device takes up such a position that when the engine is restarted, the selector actuators remain unpressurized.

The foregoing object has been achieved in an advantageous manner according to the present invention by providing that the selector valve is configured to be additionally moved into the rest position by the control pressure of the switch-over control valve and additionally into the working position by a control pressure dependent on the working pressure of the selector actuator and includes the respective control connections, the switch-over control valve is configured to be brought only into the working position in phases and is in the rest position in the steady-state condition, consisting of one of the completely engaged condition and completely disengaged condition of the selector apparatus, and a change control valve has a valve connection for a control pressure conduit leading to the control connection of the selector valve for movement thereof into the working position, a valve connection for a control pressure conduit leading to the control connection of the selector valve for movement thereof into the rest position, a valve connection for a control pressure conduit leading to the switch-over control valve and a valve connection for pressure relief and can be switched over between a rest position in which the valve connection for the control pressure conduit is connected to the valve connection for pressure relief to move the selector valve into its rest position and the valve connection for the control pressure conduit is connected to the valve connection for the control pressure conduit leading to the switch-over control valve to move the selector valve into its working position, and a working position in which the valve connection for the control pressure conduit is connected to the valve connection for the control pressure conduit leading to the switch-over control valve to move the selector valve into the rest position and the valve connection for the control pressure conduit is connected to the valve connection for pressure relief to move the selector valve into the working position, and the change control valve is switched over, as a function of the condition of the selector apparatus, such that the valve connection of the change control valve for the control pressure conduit leading to the switch-over control valve is necessarily connected in the one steady-state condition of the selector apparatus to the respective valve connection for the control pressure conduit to switch over the selector valve into one of the rest and working positions bringing the selector apparatus into the other steady-state condition.

In the selector device according to the present invention, the switch-over control valve is always in its rest position in the steady-state condition of the selector device so that an electronic or voltage failure does not change anything relative to the selector condition. The selector valve is held in its rest position by spring force in the disengaged condition of the selector device and is held in its working position in the engaged condition by the self-retention effect of the relevant control pressure dependent on the working pressure. The change control valve is always moved in advance, as a function in each instance of the instantaneous steady-state condition of the selector device, into the position in which, on excitation of the switch-over control valve, the selector valve is switched over into the position for the respective other selector condition, i.e. not the instantaneous steady-state selector condition. When the engine is switched off, the pressure supply is also switched off so that the selector valve and the change control valve are also moved by spring force into the respective rest position. As a result, the selector actuators remain unpressurized when the engine is restarted.

The control, according to the present invention, of the change control valve as a function of the steady-state condition of the selector device can be implemented in several ways. One advantageous embodiment for achieving this control provides that the change control valve can be the change control valve is configured to be moved into each of the rest and working positions by a position control pressure and has respective control connections, and a position control valve has a valve connection for a control pressure conduit leading to the control connection of the change control valve to move it into the rest position, a valve connection for a control pressure conduit leading to the control connection of the change control valve to move it into the working position, a valve connection for a control pressure supply conduit is arranged to carry a control pressure and a valve connection for pressure relief and is configured to be switched over between a rest position, in which the valve connection for the control pressure conduit is connected to the valve connection for the control pressure supply conduit to move the change control valve into its rest position and the valve connection for the control pressure conduit is connected to the valve connection for pressure relief to move the change control valve into its working position, and a working position, in which the valve connection for the control pressure conduit is connected to the valve connection for pressure relief to move the change control valve into its rest position and the valve connection for the control pressure conduit is connected to the valve connection for the control pressure supply conduit to move the change control valve into its working position, and the position control valve is configured to be moved by spring force into its rest position and moved into its working position by a control pressure dependent on the working pressure of the selector actuator.

The arrangement of the present invention can be applied to avoid premature switching over during the transient condition, i.e. during the engagement or disengagement of the selector apparatus, when the above-mentioned embodiment of the control of the change control valve is used. It is assumed that the switch-over control valve is in its rest position only in the steady-state condition of the selector.

In order to simplify the structural control complexity a multiway double valve, e.g. a 7/2-way double valve, in which the selector valve and position control valves are structurally combined can be effectively utilized.

An arrangement for disengaging a first frictional selector having a first selector device and for simultaneously engaging a second frictional selector having a second selector can be used to ensure, in gear changes with positive overlap of the variation in the working pressures for the disengagement of one selector by the first selector device according to the invention and the simultaneous engagement of a selector by the second selector device according to the invention, that in the case of an electrical defect, the activating or deactivating selector actuator whose working pressure is sufficient to transmit the necessary torque is the one which always remains actuated. This overlap control also prevents the two selectors involved from ever being engaged simultaneously which would otherwise cause the gearbox to jam.

In the case of a failure of the electrical system during the filling procedure at the selector actuator of the selector to be engaged, the filling procedure is interrupted and the selector actuator is emptied, whereas the selector actuator of the selector engaged, whose associated switch-over control valve is not excited in any event, remains activated.

The self-retention effect at the selector valve of the selector to be engaged is sufficiently high for the latter, or the new gear, to remain engaged only in the case where the working pressure of the selector actuator of the selector to be engaged is so high that the selector valve of the selector to be disengaged is moved into the rest position.

In the case of overlap control, the structural control complexity in the selector device according to the invention can again be kept low by a further multiway double valve.

BRIEF DESCRIPTION OF THE DRAWING

These and further objects, features and advantages of the present invention will become more apparent from the following detailed description of a currently preferred embodiment when taken in conjunction with the accompanying sole figure which is a schematic diagram of a system comprising the present invention.

DETAILED DESCRIPTION OF THE DRAWING

A selector device is described in AT-PS E 23 213 which differs from the selector device of the general concept of the present invention in that the selector valve control connection used to switch over into the rest position, together with correspondingly used control connections of further selector valves, is connected to a common electromagnetic 3/2-way reset valve which, during a gear change, is triggered synchronously with the switch-over control valve of the associated selector valve. Thereby, a lower control pressure force is brought into effect by the reset valve for actuation of this selector valve in its rest position and, at the same time, a higher control pressure force is brought into effect by the switch-over control valve for actuation of the selector valve in its working position, and only in pulse fashion, because the two positions of the selector valve are fixed by a locking device in order to make it possible to re-establish a condition where no electricity is supplied immediately after initiation of the selection procedure. The arrangement and mode of operation of this selector device is as advantageous relative to other known selector devices in which two electromagnetic pilot control valves are provided for each selector valve or a constant electrical current is necessary in order to hold the valve in its position.

A working pressure conduit 102 leads to a selector actuator 100 (not shown) which is used for the engagement of a conventional frictional selector device (clutch or brake) which is disengaged by a spring apparatus in a known manner. A working pressure conduit 202 leads to a selector actuator 200 (not shown) which is used for the engagement of a conventional frictional selector device (clutch or brake) which is disengaged by spring apparatus in a known manner.

The selector actuator 100 is controlled by a first selector device according to the present invention having a first 7/2-way double valve 110, a second 7/2-way double valve 120 and an electromagnetic 3/2-way switch-over control valve 130. The selector actuator 200 is controlled by a second selector device according to the present invention having a first 7/2-way double valve 210, a second 7/2-way double valve 220 and an electromagnetic 3/2-way switch-over control valve 230. The two selector devices are of identical construction and are described below using the selector device for the selector actuator 100 as an example.

The corresponding features of the other selector device for the selector actuator 200 are provided with reference numbers which are respectively increased by 100 relative to the reference number of the associated feature of the selector device for the selector actuator 100. For example, conduit 102 associated with the one selector device become conduit 202 in the other selector device.

The functions of a 3/2-way selector valve 110-1 and a 4/2-way position control valve 110-2 are structurally combined in the 7/2-way double valve 110. The selector valve 110-1 has a valve connection 110-102 for the working pressure conduit 102, a valve connection N1 for pressure relief and a valve connection 110-141 for a pressure conduit 141 which is connected, via a throttle orifice 141-1, to a system pressure conduit R which carries a system pressure which is or can be controlled as a function of operating parameters.

In the rest position, indicated by "0", of the selector valve 110-1, the valve connection 110-102 is connected to the valve connection N1 and the valve connection 110-141 is shut off. In the working position, indicated by "1", of the selector valve 110-1, the valve connections 110-102 and 110-141 are connected together and the valve connection N1 is shut off.

The position control valve 110-102 has a valve connection 110-P for a control pressure conduit P, a valve connection N2 for pressure relief, a valve connection 110-111 for a control pressure conduit 111 and a valve connection 110-112 for a control pressure conduit 112.

In the rest position, indicated by "0", of the position control valve 110-2, the valve connection 110-P is connected to the valve connection 110-111 and the valve connection N2 is connected to the valve connection 110-112. In the working position, indicated by "1", of the position control valve 110-2, the valve connection 110-P is connected to the valve connection 110-112 and the valve connection N2 is connected to the valve connection 110-111. The selector valve 110-1 and the position control valve 110-2 take up their respective rest positions and hence their working positions synchronously.

The double valve 110 can be initially moved by spring force 110F into the rest position "0". For its movement into the rest position "0", the double valve 110 is also provided with a control connection 110-123* for a control pressure conduit 123 and with a control connection 110-Ü* for an overlap control conduit Ü 200. For its movement into the working position "1", the double valve 110 has a control connection 110-102* for a control pressure conduit 102* branching off from the working pressure conduit 102 and a control connection 110-121* for a control pressure conduit 121.

The functions of a 4/2-way change control valve 120-1 and a 3/2-way overlap control valve 120-2 are structurally combined in the 7/2-way double valve 120. The change control valve 120-1 has a valve connection 120-121 for the control pressure conduit 121, a valve connection 120-123 for the control pressure conduit 123, a valve connection N1 for pressure relief and a valve connection 120-131 for a control pressure conduit 131 leading to the switch-over control valve 130. In the rest position, indicated by "0", of the change control valve 120-1, the valve connection 120-121 is connected to the valve connection 120-123 and the valve connection 120-123 is connected to the valve connection N1. In the working position, indicated by "1", of the change control valve 120-1, the valve connection 120-121 is connected to the valve connection N1 and the valve connection 120-123 is connected to the valve connection 120-131.

The overlap control valve 120-2 has a valve connection 120-102 for the control pressure conduit 102*, a valve connection N2 for pressure relief and a valve connection 120-Ü for an overlap control pressure conduit Ü 100. In the rest position, indicated by "0", of the overlap control valve 120-2, the valve connection N2 is connected to the valve connection 120-Ü and the valve connection 120-102 is shut off. In the working position, indicated by "1", of the overlap control valve 120-2, the valve connection 120-102 is connected to the valve connection 120-Ü and the valve connection N2 is shut off.

The arrangement is such that the change control valve 120-1 is in its rest position "0" and, synchronously, the overlap control valve 120-2 is in its working position "1" and vice versa. The double valve 120 can be moved into the position corresponding to the rest position "0" of the change control valve 120-1 both by a spring force 120F and by the respective control pressure of the control pressure conduits 111 and 112; the double valve 120 has corresponding control connections 120-111* and 120-121* for the last-mentioned control pressures and control pressure conduits. The double valve 120 can be moved into its other position corresponding to the working position "1" of the change control valve 120-1 by the control pressures of the control pressure conduits 112 and 123. The corresponding control connections provided on the double valve are indicated by 120-112* and 120-123*.

The overlap control pressure conduit Ü 200 leads to the outlet end valve connection 220-Ü of the overlap control valve 220-2, and the overlap control conduit Ü 100 is connected to the control connection 210-Ü* of the double valve 210.

The switch-over control valve 130 has a valve connection 130-131 for the control pressure conduit 131, a valve connection N for pressure relief and a valve connection 130-P for the control pressure supply conduit P. The switch-over control valve 130 can be moved by spring force 130F into its rest position, indicated by "0", in which the valve connections 130-131 and N are connected together and the valve connection 130-P is shut off. The switch-over control valve 130 can be switched over into its working position, indicated by "1", by an electromagnet 130EM which can be triggered by a conventional electronic control unit (not shown). In this working position, indicated by "1", the valve connections 130-131 and 130-P are connected together and the valve connection N is shut off.

The mode of operation of the selector devices is as follows.

In the unpressurized steady-state condition of the selector actuator 100, the valves 110, 120-1 and 130 are in the rest position. With the exception of the control pressure conduit 111 connected to the control pressure supply conduit P, all of the connecting conduits are unpressurized.

Applying Pressure to the Selector Actuator 100 in Order to Engage the Associated Selector Means The switch-over control valve 130 is moved by the gearbox electronic system into the working position "1" so that the control pressure conduit 131 is subjected to the control pressure P. The control pressure conduit 121 is also subjected to the control pressure P by the change control valve 120-1 so that the selector valve 110-1 is moved into its working position "1".

In the case of gear changes with positive overlap, the force exerted by the control pressure P on the selector valve 110-1 must be greater than the sum of the spring force 110F and the control pressure force of the overlap control pressure conduit Ü 200.

In the working position "1" of the selector valve 110-1, the control pressure conduit 111 is unpressurized and the control pressure conduit 112 is subjected to the initially remains in the rest position "0", however, because the resultant control pressure force at the control connection 120-112* is smaller than the opposing sum of the spring force 120F and the control pressure force at the control connection 120-121* for the control pressure conduit 121.

The selector valve 110-1 has connected the working pressure conduit 102, leading to the selector actuator 100, to the pressure conduit 141 so that the filling of the working pressure chamber of the selector actuator 100 begins. The pressure in the conduits 102 and 141 falls to the filling pressure level, which is determined by the disengagement springs in the selector actuator 100. So as to avoid this also influencing the level of the system pressure conduit R, the throttle orifice 141-1 is used for decoupling purposes.

After the selector actuator 100 has been completely filled, the pressure in the conduits 102 and 141 rises to the level of the system pressure R. The application of pressure to the selector actuator 100 can now, therefore, be controlled by the system pressure R. The pressure in the selector actuator 100 holds the selector valve 110-1 in the working position "1" via the control connection 110-102*. The pressure level which is acting in the selector actuator 100 is available, via the overlap control valve 120-2 and the overlap control pressure conduit Ü 100, to control the positive overlap. As soon as this pressure level has exceeded a specified value, the selector valve 210-1 is forced into the rest position "0" so that the selector actuator 200 of the selector to be disengaged becomes unpressurized.

After the conclusion of the filling procedure in the selector actuator 100, the electrical supply to the switch-over control valve 130 is switched off so that the latter is moved into its rest position "0". Consequently, the control pressure conduits 131 and 121 become unpressurized and the change control valve 120-1 is therefore switched over into its working position "1" by the control pressure of the control pressure conduit 112. The "selector actuator 100 activated" steady-state condition is thus attained.

Switching Off the Selector Actuator 100 under Electrical Control (Negative Overlap)

The switch-over control valve 130 is electrically excited by the gearbox electronic system and thereby moved into its working position "1". This subjects the control pressure conduits 131 and 123 to the control pressure P. The selector valve 110-1 is moved into its rest position "0" by the control pressure of the control pressure conduit 123 and the spring force 110F. For this purpose, the sum of the spring force 110F and the control pressure of the control pressure conduit 123 must be greater than the control pressure at the control connection 110-102*.

In the rest position "0", the control pressure conduit 112 is unpressurized and the control pressure conduit 111 is subjected to the control pressure P. The change control valve 120-1 initially remains in its working position "1" because the control pressure of the control pressure conduit 123 at the control connection 120-123* exerts a greater force than the combination of the spring force 120F and the control pressure of the control pressure conduit 111 at the control connection 120-111*. The working pressure conduit 102 of the selector actuator 100 is relieved via the selector valve 110-1 so that the selector actuator 110 becomes unpressurized and empties.

Finally, the electrical supply to the switch-over control valve 130 is switched off. The switch-over control valve 130 is moved into its rest position "0" so that the control pressure conduits 131 and 123 become unpressurized. The change control valve 120-1 is now moved into its rest position "0" by the control pressure of the control pressure conduit 111 supported by the spring force 120F. In this way, the control pressure conduit 123 is connected to the valve connection N1 of the change control valve 120-1 and the control pressure conduit 121 is connected to the valve connection N of the switch-over control valve 130 via the control pressure conduit 131. The "selector actuator 100 unpressurized" steady-state condition is thus reattained.

Switching Off the Selector Actuator 100 under Hydraulic Control (Positive Overlap on Activation of the Selector Actuator 200)

The switch-over control valve 230 is electrically excited by the gearbox electronic system and moved into its working position "1". This subjects the control pressure conduits 231, 221 to the control pressure P so that the selector valve 210-1 is switched over into its working position "1" by the control pressure at its control connection 210-221*. For this purpose, this control pressure force must be greater than the opposing spring force 210F, which is possibly supported by the control pressure force at the control connection 210-Ü*.

In the working position "1" of the selector valve 210-1, the control pressure conduit 211 is unpressurized and the control pressure conduit 212 is subjected to the control pressure P. The change control valve 220-1 initially remains in the rest position "0", however, because the effect of the spring force 220F and the control pressure of the control pressure conduit 221 is greater than the effect of the control pressure of the control pressure conduit 212.

The selector valve 210-1 connects the working pressure conduit 202 of the selector actuator 200 to the pressure conduit 241 so that the filling of the selector actuator 200 begins. After the selector actuator 200 has been completely filled, the pressure in the conduits 202, 241 rises. The working pressure in the selector actuator 200 holds the selector valve 210-1 in the working position "1" via the working pressure conduit 202. As soon as the working pressure in the working pressure conduit 202 has exceeded a specified value, the selector valve 110-1 of the selector actuator 100 to be deactivated is moved into the rest position "0" by way of the overlap control valve 220-2 and the overlap control conduit Ü 200 so that the selector actuator 100 becomes unpressurized.

As a result, the control pressure conduit 112 is connected to the pressure relief connection N2 and the control pressure conduit 111 is connected to the valve connection 110-P for the control pressure. The change control valve 120-1 is moved back into its rest position "0" by the joint effect of the control pressure of the control pressure conduit 111 and the spring force 120F. The "selector actuator 100 unpressurized" steady-state condition is thus attained.

The electrical supply to the switch-over control valve 230 is switched off so that the switch-over control valve is moved into its rest position "0" and the control pressure conduits 231, 221 become unpressurized. The change control valve 220-1 is thereby moved into its working position "1" by the control pressure of the control pressure conduit 212 so that the control pressure conduit 223, which had already become unpressurized previously, is now connected to the unpressurized control pressure conduit 231 and the control pressure conduit 221 is connected to the pressure relief connection N1 of the change control valve 220-1. The "selector actuator 200 activated" steady-state condition is thus attained.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An automatic selector device for a change-speed gearbox of the epicyclic type, having frictional selector apparatus configured to be engaged by a selector actuator of axial piston type between plural gearbox elements rotatable relative to one another, comprising a selector valve for application of working pressure to the selector actuator and an electromagnet switch-over control valve configured to be electronically triggered to switch over the selector valve, both the selector valve and the switch-over control valve are arranged to be respectively switched over between a rest position selectable by spring force and a working position, the selector actuator being connected to a pressure-relieved zero connection in the rest position of the selector valve and being connected to a system pressure conduit carrying a controlled system pressure in the working position, while a control connection of the selector valve used for switching over into the rest position is connected to a pressure-relieved zero connection in the rest position of the switch-over control valve and connected to a control pressure supply conduit carrying a control pressure in the working position of the switch-over control valve, wherein the selector valve is configured to be additionally moved into the rest position by the control pressure of the switch-over control valve and additionally into the working position by a control pressure dependent on the working pressure of the selector actuator and includes the respective control connections, the switch-over control valve is configured to be brought only into the working position in phases and is in the rest position in the steady-state condition, consisting of one of the completely engaged condition and completely disengaged condition of the selector apparatus, and a change control valve has a valve connection for a control pressure conduit leading to the control connection of the selector valve for movement thereof into the working position, a valve connection for a control pressure conduit leading to the control connection of the selector valve for movement thereof into the rest position, a valve connection for a control pressure conduit leading to the switch-over control valve and a valve connection for pressure relief and can be switched over between a rest position in which the valve connection for the control pressure conduit is connected to the valve connection for pressure relief to move the selector valve into its rest position and the valve connection for the control pressure conduit is connected to the valve connection for the control pressure conduit leading to the switch-over control valve to move the selector valve into its working position, and a working position in which the valve connection for the control pressure conduit is connected to the valve connection for the control pressure conduit leading to the switch-over control valve to move the selector valve into the rest position and the valve connection for the control pressure conduit is connected to the valve connection for pressure relief to move the selector valve into the working position, and the change control valve is switched over, as a function of the condition of the selector apparatus, such that the valve connection of the change control valve for the control pressure conduit leading to the switch-over control valve is necessarily connected in the one steady-state condition of the selector apparatus to the respective valve connection for the control pressure conduit to switch over the selector valve into one of the rest and working positions bringing the selector apparatus into the other steady-state condition.

2. The automatic selector device according to claim 1, wherein the change control valve is configured to be moved into each of the rest and working positions by a position control pressure and has respective control connections, and a position control valve has a valve connection for a control pressure conduit leading to the control connection of the change control valve to move it into the rest position, a valve connection for a control pressure conduit leading to the control connection of the change control valve to move it into the working position, a valve connection for a control pressure supply conduit is arranged to carry a control pressure and a valve connection for pressure relief and is configured to be switched over between a rest position, in which the valve connection for the control pressure conduit is connected to the valve connection for the control pressure supply conduit to move the change control valve into its rest position and the valve connection for the control pressure conduit is connected to the valve connection for pressure relief to move the change control valve into its working position, and a working position, in which the valve connection for the control pressure conduit is connected to the valve connection for pressure relief to move the change control valve into its rest position and the valve connection for the control pressure conduit is connected to the valve connection for the control pressure supply conduit to move the change control valve into its working position, and the position control valve is configured to be moved by spring force into its rest position and moved into its working position by a control pressure dependent on the working pressure of the selector actuator.

3. The automatic selector device according to claim 2, wherein the change control valve can additionally be moved into each of its rest and working positions, by a respective control pressure dependent on the switch-over control valve and has respective control connections, and the control connection of the change control valve is connected, for movement of the change control valve into the rest position by the control pressure dependent on the switch-over control valve, to the control pressure conduit leading to the selector valve for movement thereof into the working position by the control pressure dependent on the switch-over control valve, and the control connection of the change control valve is connected, for movement of the change control valve into the working position by the control pressure dependent on the switch-over control valve, to the control pressure conduit leading to the selector valve for movement thereof into the rest position by the control pressure dependent on the switch-over control valve.

4. The automatic selector device according to claim 1, wherein the selector valve and a position control valve constitute a structurally combined common 7/2-way double valve.

5. The automatic selector device according to claim 4, wherein the change control valve is configured to be moved into each of the rest and working positions by a position control pressure and has respective control connections, and a position control valve has a valve connection for a control pressure conduit leading to the control connection of the change control valve to move it into the rest position, a valve connection for a control pressure conduit leading to the control connection of the change control valve to move it into the working position, a valve connection for a control pressure supply conduit is arranged to carry a control pressure and a valve connection for pressure relief and is configured to be switched over between a rest position, in which the valve connection for the control pressure conduit is connected to the valve connection for the control pressure supply conduit to move the change control valve into its rest position and the valve connection for the control pressure conduit is connected to the valve connection for pressure relief to move the change control valve into its working position, and a working position, in which the valve connection for the control pressure conduit is connected to the valve connection for pressure relief to move the change control valve into its rest position and the valve connection for the control pressure conduit is connected to the valve connection for the control pressure supply conduit to move the change control valve into its working position, and the position control valve is configured to be moved by spring force into its rest position and moved into its working position by a control pressure dependent on the working pressure of the selector actuator.

6. An arrangement for disengaging a first frictional selector apparatus having a first selector device for a change speed selector device for a change-speed gearbox of the epicyclic type, having frictional selector apparatus configured to be engaged by a selector actuator of axial piston type between plural gearbox elements rotatable relative to one another, comprising a selector valve for application of working pressure to the selector actuator and an electromagnet switch-over control valve configured to be electronically triggered to switch over the selector valve, both the selector valve and the switch-over control valve are arranged to be respectively switched over between a rest position selectable by spring force and a working position, the selector actuator being connected to a pressure-relieved zero connection in the rest position of the selector valve and being connected to a system pressure conduit carrying a controlled system pressure in the working position, while a control connection of the selector valve used for switching over into the rest position is connected to a pressure-relieved zero connection in the rest position of the switch-over control valve and connected to control pressure supply conduit carrying a control pressure in the working position of the switch-over control valve, the selector valve is configured to be additionally moved into the rest position by the control pressure of the switch-over control valve and additionally into the working position by a control pressure dependent on the working pressure of the selector actuator and includes the respective control connections, the switch-over control valve is configured to be brought only into the working position in phases and is in the rest position in the steady-state condition, consisting of one of the completely engaged condition and completely disengaged condition of the selector apparatus, and a change control valve has a valve connection for a control pressure conduit leading to the control connection of the selector valve for movement thereof into the working position, a valve connection for a control pressure conduit leading to the control connection of the selector valve for movement thereof into the rest position, a valve connection for a control pressure conduit leading to the switch-over control valve and a valve connection for pressure relief and can be switched over between a rest position in which the valve connection for the control pressure conduit is connected to the control connection for pressure relief to move the selector control into its rest position and the control connection for the control pressure conduit is connected to the control connection for the control pressure conduit leading to the switch-over control valve to move the selector valve into its working position, and a working position in which the valve connection for the control pressure conduit is connected to the valve connection for the control pressure conduit leading to the switch-over control valve to move the selector valve into the rest position and the valve connection for the control pressure conduit is connected to the valve connection for pressure relief to move the selector valve into the working position, and the change control valve is switched over, as a function of the condition of the selector apparatus, such that the valve connection of the change control valve for the control pressure conduit leading to the switch-over control valve is necessarily connected in the one steady-state condition of the selector apparatus to the respective valve condition of the selector apparatus to the respective valve connection for the control pressure conduit to switch over the selector valve into one of the rest and working positions bringing the selector apparatus into the other steady-state condition and for simultaneously engaging a second frictional selector apparatus having a second selector device for the change speed selector device for the change-speed gearbox of the epicyclic type, having a second frictional selector apparatus configured to be engaged by a second selector actuator of axial piston type between plural gearbox elements rotatable relative to one another, comprising a second selector valve for application of a working pressure to the second selector actuator and a second electromagnet switch-over control valve configured to be electronically triggered to switch over the second selector valve, both the second selector valve and the second switch-over control valve are arranged to be respectively switched over between a rest position selectable by spring force and a working position, the second selector actuator being connected to a pressure-relieved zero connection in the rest position of the second selector valve and being connected to a system pressure conduit carrying a controlled system pressure in the working position, while a control connection of the second selector valve used for switching over into the rest position is connected to a pressure-relieved zero connection in the erst position of the second switch-over control valve and connected to a control pressure supply conduit carrying ak control pressure in the working position of the switch-over control valve, the selector valve is configured to be additionally moved into the rest position by the control pressure of the second switch-over control valve and additionally into the working position by a control pressure dependent on the working pressure of the second selector actuator and includes the respective control connections, the second switch-over control valve is configured to be brought only into the working position in phases and is in the rest position in the steady-state condition, consisting of one of the completely engaged condition and completely disengaged condition of the second selector apparatus, and a second change control valve has a valve connection for a control pressure conduit leading to the control connection of the second selector valve for movement thereof into the working position, a valve connection for a control pressure conduit leading to the control connection of the second selector valve for movement thereof into the rest position, a valve connection for a control pressure conduit leading to the second switch-over control valve and a valve connection for pressure relief and can be switched over between a rest position in which the valve connection for the control pressure conduit is connected to the valve connection for pressure relief to move the second selector valve into its rest position and the valve connection for the control pressure conduit is connected to the valve connection for the control pressure conduit leading to the second switch-over control valve to move the second position valve into its working position, and a working position in which the valve connection for the control pressure conduit is connected to the valve connection for the control pressure conduit leading to the second switch-over control valve to move the second selector valve into the rest position and the valve connection for the control pressure conduit is connected to the valve connection for pressure relief to move the second selector valve into the working position, and the second change control valve is switched over, as a function of the second condition of the selector apparatus, such that the valve connection of the second change control valve for the control pressure conduit leading to the second switch-over control valve is connected in the one steady-state condition of the second selector apparatus to the respective valve connection for the control pressure conduit to switch over the second selector valve into one of the rest and working positions bringing the second selector apparatus into the other steady-state condition, wherein the selector valve of the first selector device is configured to be additionally moved into its rest position by a control pressure dependent on the working pressure of the selector actuator of the second selector device and has a respective control connection, and an overlap control valve of the second selector device dependent on the condition of the second selector apparatus has a valve connection for a control pressure conduit connected to the working pressure conduit of the selector actuator of the second selector device, a valve connection for a control pressure conduit leading to the control connection of the selector valve of the first selector device for the movement of this selection valve into the rest position by the control pressure dependent on the working pressure of the selector actuator of the second selector device and a valve connection for pressure relief and can be switched over between a rest position in which the valve connection for the control pressure conduit connected to the working pressure conduit of the selector actuator of the second selector device is shut off and the valve connection for pressure relief is connected to the valve connection for the control pressure conduit leading to the selector valve of the first selector device, and a working position in which the valve connection for the control pressure conduit connected to the working pressure conduit of the selector actuator of the second selector device is connected to the valve connection for the control pressure conduit leading to the selector valve of the first selector device and the valve connection for pressure relief is shut off, and the overlap control valve is necessarily moved into its rest position when the second selector apparatus has reached the fully-engaged condition.

7. The arrangement according to claim 5, wherein the change control valve and the overlap control valve constitute a structurally combined 7/2-way double valve configured such that the change control valve is necessarily in its rest position when the overlap control valve moves to its working position and vice versa.

* * * * *